(12) United States Patent
Heo et al.

(10) Patent No.: US 10,476,326 B2
(45) Date of Patent: Nov. 12, 2019

(54) ROTOR FOR PERMANENT MAGNET EMBEDDED-TYPE MOTOR AND MOTOR USING THE SAME

(71) Applicant: Hanon Systems, Daejeon (KR)

(72) Inventors: Jeong Gil Heo, Daejeon (KR); Chan Ho Baek, Daejeon (KR); Bong Kyun Seo, Daejeon (KR)

(73) Assignee: Hanon Systems, Daejeon (KR)

( * ) Notice: Subject to any disclaimer, the term of this patent is extended or adjusted under 35 U.S.C. 154(b) by 87 days.

(21) Appl. No.: 15/745,860

(22) PCT Filed: Dec. 16, 2016

(86) PCT No.: PCT/KR2016/014839
§ 371 (c)(1),
(2) Date: Jan. 18, 2018

(87) PCT Pub. No.: WO2017/105147
PCT Pub. Date: Jun. 22, 2017

(65) Prior Publication Data
US 2018/0205274 A1 Jul. 19, 2018

(30) Foreign Application Priority Data

Dec. 18, 2015 (KR) .................. 10-2015-0181794
Dec. 23, 2015 (KR) .................. 10-2015-0185435

(51) Int. Cl.
*H02K 1/27* (2006.01)
*H02K 1/32* (2006.01)
(Continued)

(52) U.S. Cl.
CPC .............. *H02K 1/276* (2013.01); *H02K 1/16* (2013.01); *H02K 1/32* (2013.01); *H02K 29/03* (2013.01)

(58) Field of Classification Search
CPC ............ H02K 1/16; H02K 1/24; H02K 21/14; H02K 1/27; H02K 1/276; H02K 1/2766;
(Continued)

(56) References Cited

U.S. PATENT DOCUMENTS 6,008,559 A * 12/1999 Asano .................. H02K 1/2766
310/156.53
6,218,753 B1 * 4/2001 Asano .................... H02K 1/276
310/156.53
(Continued)

FOREIGN PATENT DOCUMENTS

JP 2009273258 11/2009
JP 2013-99050 A 5/2013
(Continued)

OTHER PUBLICATIONS

International Search Report for PCT Application No. PCT/KR2016/014839 dated Mar. 20, 2017.

*Primary Examiner* — Alex W Mok
(74) *Attorney, Agent, or Firm* — Carlson, Gaskey & Olds, P.C.

(57) ABSTRACT

A rotor is for a permanent magnet embedded-type motor and a motor using the same. A rotor for a permanent magnet embedded-type motor includes a rotor core having a rotary shaft fixed to a center and having a plurality of magnet insertion holes formed to be spaced along a circumferential direction and a plurality of pairs of permanent magnets, respectively, inserted into each of the plurality of magnet insertion holes in a V-shape to be gradually spaced apart from each other toward a radially outer side. Each of the plurality of magnet insertion holes includes a pair of inner sides facing each other, and a barrier hole is formed to expand an inner space of each of the magnet insertion holes to protrude from the pair of inner sides, respectively.

18 Claims, 8 Drawing Sheets

(51) Int. Cl.
*H02K 1/16* (2006.01)
*H02K 29/03* (2006.01)

(58) Field of Classification Search
CPC ...... H02K 1/32; H02K 2213/03; H02K 29/03; H02K 1/278
USPC .................................................... 310/156.01
See application file for complete search history.

(56) References Cited

U.S. PATENT DOCUMENTS

| | | | |
|---|---|---|---|
| 2004/0256940 A1* | 12/2004 | Tsuruta | H02K 1/276 310/156.53 |
| 2005/0140235 A1* | 6/2005 | Yamagishi | H02K 1/276 310/156.53 |
| 2010/0061868 A1* | 3/2010 | Kojima | F04C 23/008 417/410.1 |
| 2011/0193439 A1* | 8/2011 | Yabe | H02K 1/2766 310/156.38 |
| 2015/0236556 A1* | 8/2015 | Suwazono | H02K 1/276 310/156.53 |
| 2015/0236558 A1* | 8/2015 | Oketani | H02K 1/28 310/43 |
| 2015/0256038 A1* | 9/2015 | Nigo | H02K 1/276 62/498 |

FOREIGN PATENT DOCUMENTS

| | | |
|---|---|---|
| JP | 2015-12620 A | 1/2015 |
| KR | 10-1395332 B1 | 5/2014 |
| KR | 10-2014-0100337 A | 8/2014 |
| WO | 2015059768 | 4/2015 |

* cited by examiner

[FIG. 1]
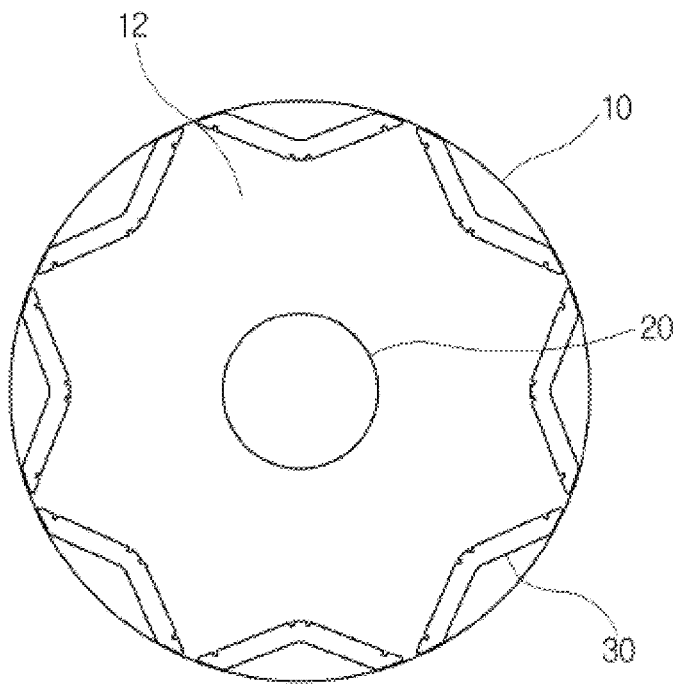

[FIG. 2]
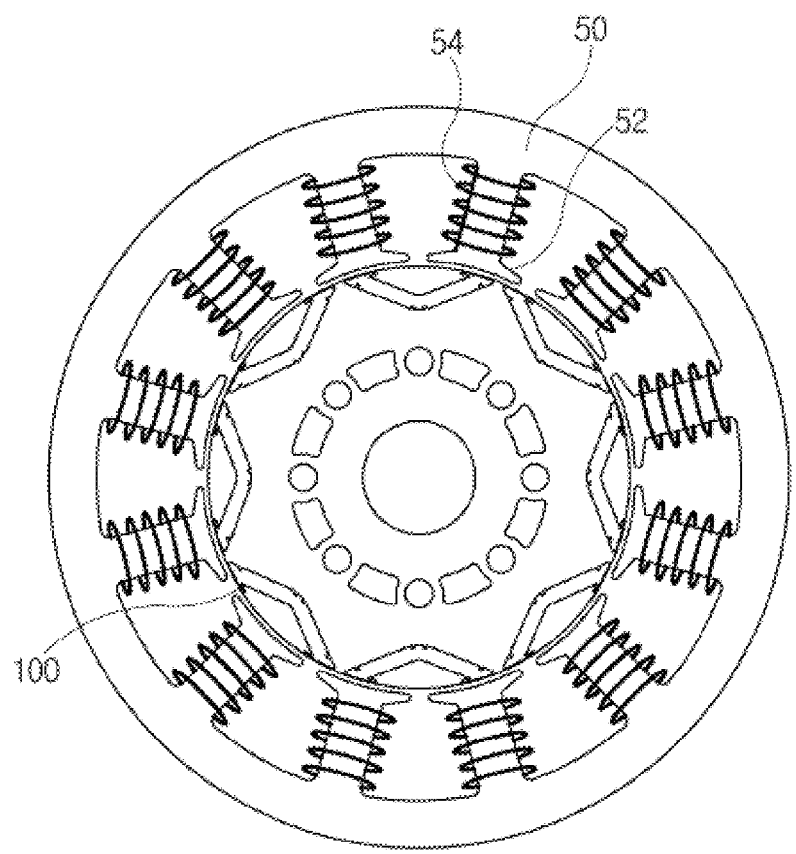

[FIG. 3]
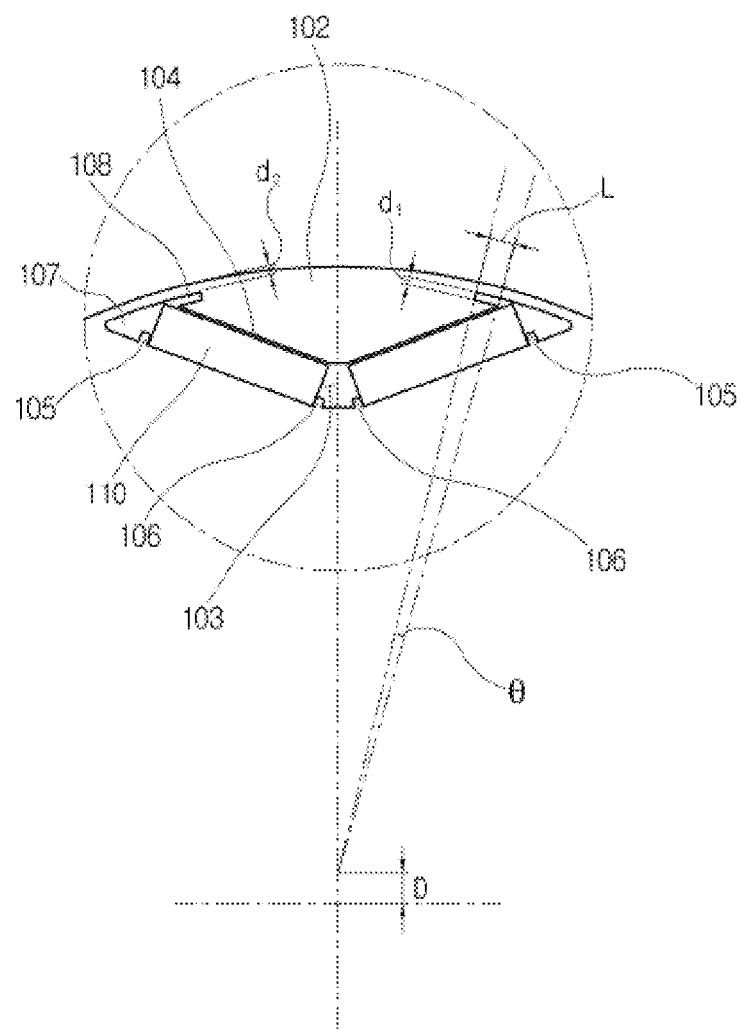

[FIG. 4]
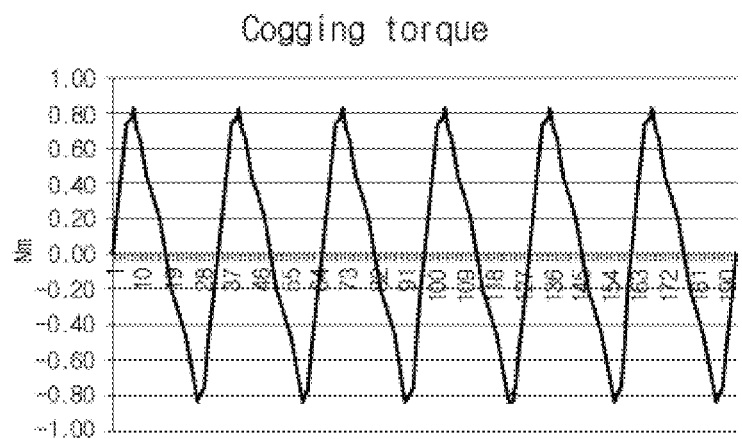
[FIG. 5]
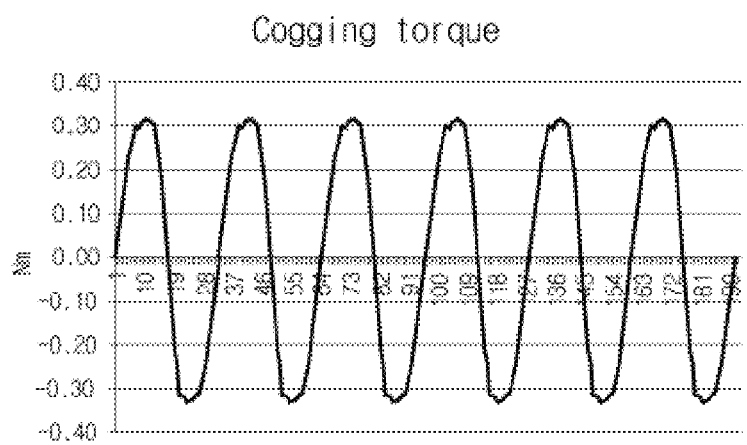

[FIG. 6]
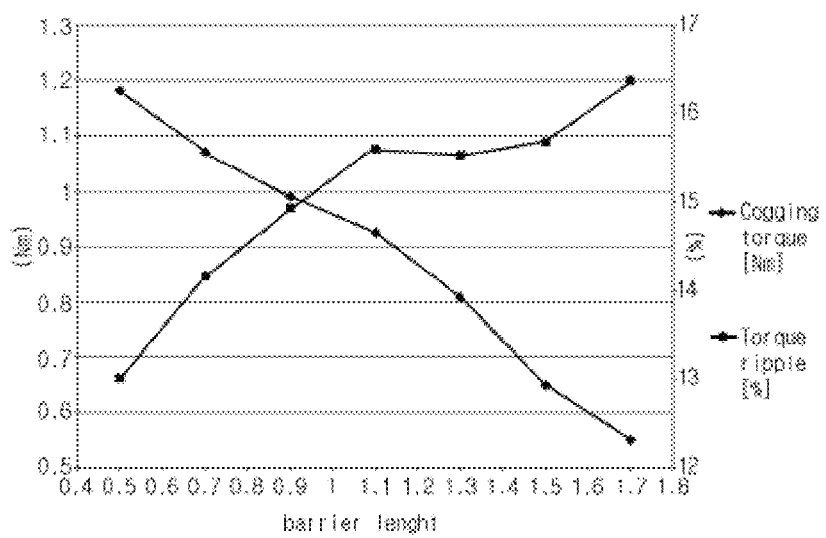

[FIG. 7]
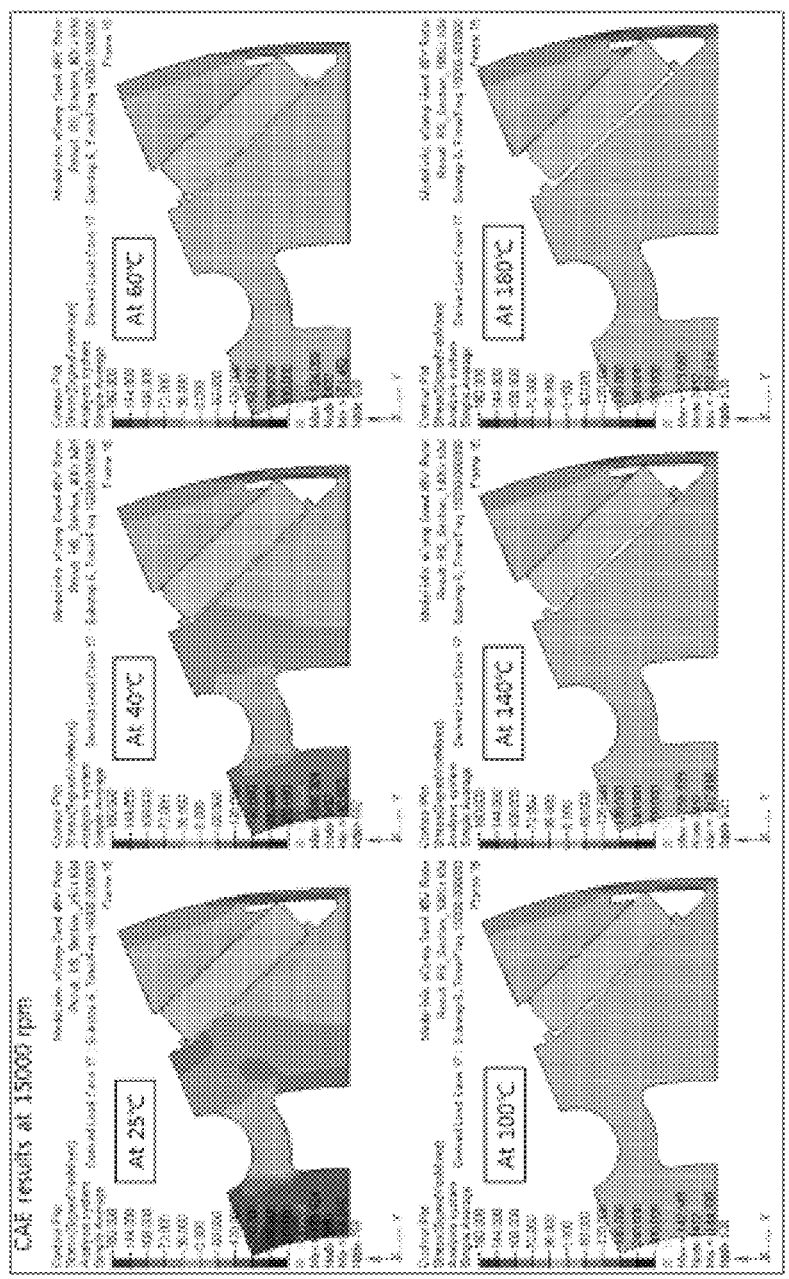

[FIG. 8]
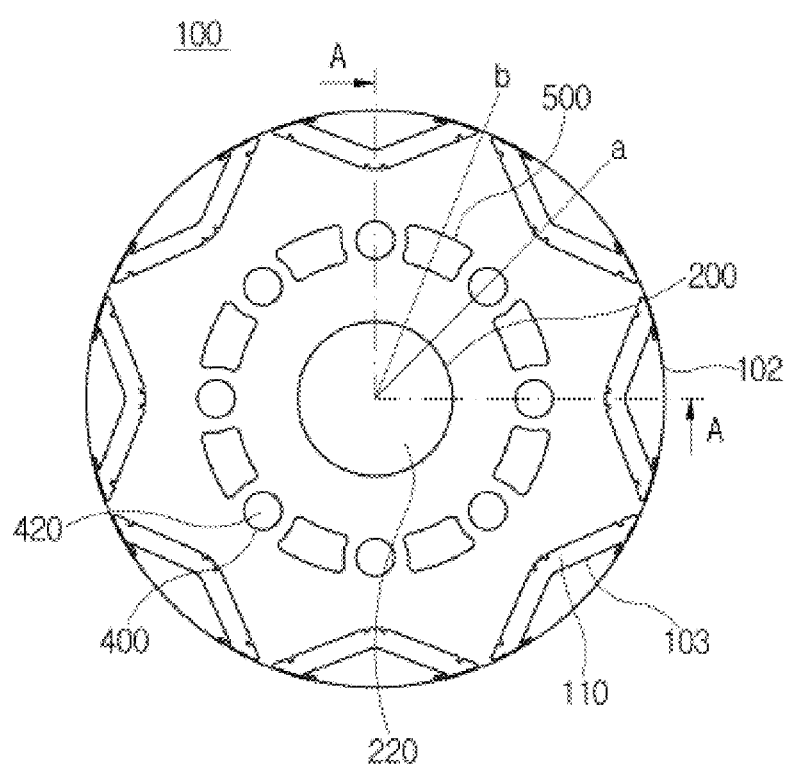

[FIG. 9]
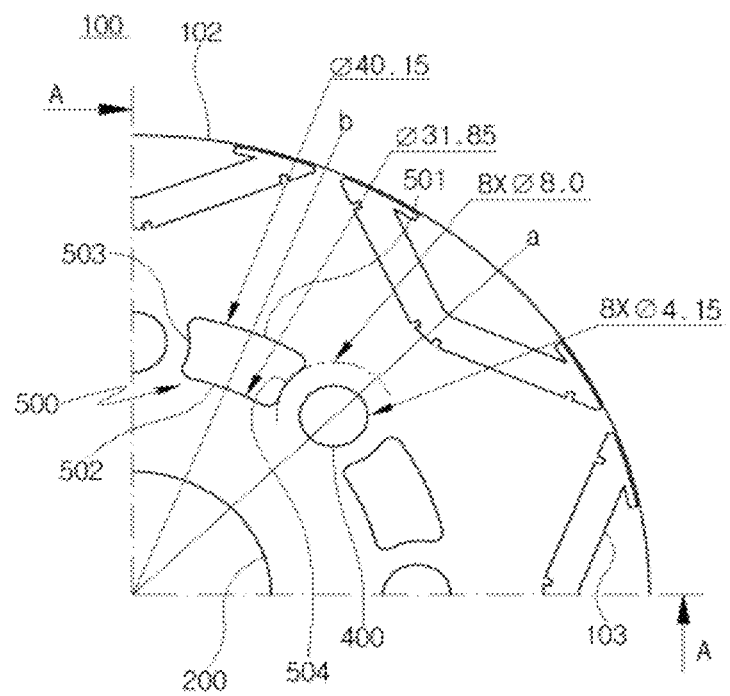
[FIG. 10]
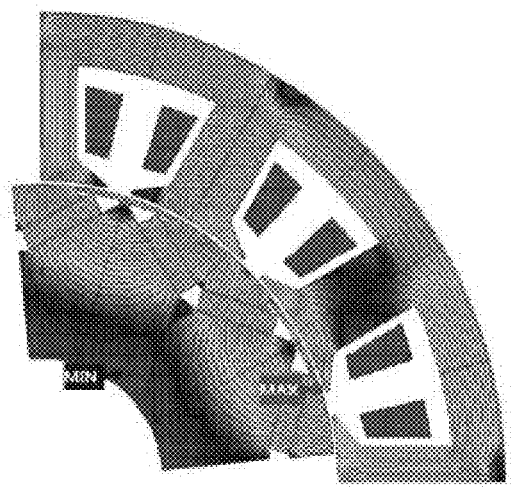

US 10,476,326 B2

ROTOR FOR PERMANENT MAGNET EMBEDDED-TYPE MOTOR AND MOTOR USING THE SAME

REFERENCE TO RELATED APPLICATIONS

This application is a United States National Phase application of PCT/KR2016/014839 filed on Dec. 16, 2016, which claims priority to Korean Application No. 10-2015-0181794 filed on Dec. 18, 2015 and Korean Application No. 10-2015-0185435 filed on Dec. 23, 2015.

TECHNICAL FIELD

Exemplary embodiments of the present invention relate to a rotor for a permanent magnet embedded-type motor and a motor using the same, and more particularly, to a rotor with a permanent magnet embedded therein and a motor having the same.

BACKGROUND ART

Recently, a so-called brushless motor (Brushless DC Motor: BLDC motor) of an electronic switching method using a semiconductor device is being widely used considering problems of mechanical contact-type of the commutator and the brush, and the brushless motor may be classified into an interior rotor type and an exterior rotor type according to arrangements of a stator and a rotor.

The interior rotor type motor uses a rotor inserting a shaft into a center of a permanent magnet in a cylindrical shape, or a so-called IPM-type permanent magnet insertion rotor inserting a shaft into a center of a rotor core, which stacks electric steel plates, and inserting a plurality of permanent magnets into a rotor core.

Recently, a permanent magnet embedded-type motor (hereinafter, IPM motor) using a reluctance torque in addition to a magnet torque as a high efficiency motor is being used. The reluctance torque is a force generated using a saliency of a d-axis inductance (Ld) and a q-axis inductance (Lq) and for this purpose, a permanent magnet has been often arranged in a V-shape.

An example of the rotor used in the permanent magnet embedded-type motor is shown in FIG. 1. Referring to FIG. 1, the rotor may be used as a driving portion for an electric compressor and the like and positioned at an inner side of a stator having a teeth protruded in an inner side direction and a coil wound around the teeth. The rotor 10 includes a rotor core 12 formed by stacking a plurality of electric steel plates. A plurality of pairs of the permanent magnets, which are arranged to form a substantially V-shape adjacent to an outer side of the rotor core 12, are fixed within the rotor core 12 in an embedded shape.

And, substantially a center of the rotor core 12 is provided with a driving shaft hole 20 inserting and fixing a driving shaft. A plurality of permanent magnet insertion holes 30 are formed at regular intervals in a V-shape which is wide open toward a stator side with respect to the driving shaft hole 20. The rotor core 12 between the driving shaft hole 20 and the permanent magnet insertion hole 30 functions as passage of a magnetic flux and also functions as supporting a rotating force of the driving shaft.

Meanwhile, there has been a problem to increase a cogging torque when increasing the number of a magnet or reducing an air gap with the stator core so as to increase the torque and efficiency in the motor as described above. If the cogging torque increases, then there are problems that noise increases and a control of the motor also becomes difficult.

Further, a plurality of permanent magnets are installed so that the driving shaft is positioned tightly close to the driving shaft hole 20 using a press fitting method and the permanent magnet closes the insertion hole with respect to the permanent magnet insertion hole 30. Thus, there is a problem that the motor may be overheated because the rotor 10 has no passage for emitting heat.

Furthermore, it is recently necessary to reduce a weight of the rotor 10 so as to achieve cost savings and enhance a rotating force.

However, in a case of forming a hole at anywhere in the rotor core 12, there may occur problems to reduce a supporting force for supporting the driving shaft and thus to make rotation unstable, and to disturb passage of the magnetic flux and thus to weaken the magnetic flux.

DISCLOSURE

Technical Problem

The present invention is proposed to overcome the disadvantages of the prior art; and a technical object of the present invention is to provide a rotor for a permanent magnet embedded-type motor capable of minimizing change of the rotor and also reducing a cogging torque.

Further, another technical object of the present invention is to provide a rotor for a permanent magnet embedded-type motor capable of achieving a light weight and cost savings, and enhancing a cooling efficiency of a motor.

Further, still another technical object of the present invention is to provide a motor having the above rotor.

Technical Solution

According to one embodiment of the present invention for achieving the above technical objects, provided is a rotor for a permanent magnet embedded-type motor including a rotor core having a rotary shaft fixed to a center and having a plurality of magnet insertion holes formed to be spaced along a circumferential direction, and a plurality of pairs of permanent magnets, respectively inserted into each of the plurality of magnet insertion holes in a V-shape to be gradually spaced apart from each other toward a radially outer side. Each of the plurality of magnet insertion holes includes a pair of inner sides facing each other. A barrier hole is further formed to expand an inner space of each of the magnet insertion holes so as to protrude from the pair of inner sides, respectively.

According to the above aspect of the present invention, it is possible to expand a space of a magnet insertion hole and restrain delivery of a magnetic flux generated by a permanent magnet to a stator, thus minimizing occurrence of a cogging torque. That is, considering that a cogging torque curbs rotation of a rotor while a permanent magnet pulls a stator, a barrier hole, which restrains a magnetic flux at the position where gives the largest influence on the stator among permanent magnets, is formed. As a result, it is possible to reduce the cogging torque compared to a prior art.

Herein, the barrier hole may have any shape, but may be extended in a circular arc shape so as to further uniformly block a magnetic flux.

Further, each of the magnet insertion holes is formed to have a V-shape. The barrier hole may be extended along a circumferential direction toward a center of the magnet insertion hole.

Further, an angle of two lines connecting both end portions of the barrier hole and the center of the rotor core, respectively may be 12° to 14°.

Further, the barrier hole may have a length of 1.1 mm to 1.5 mm.

Further, the barrier hole may have a thickness of more than 0.4 mm.

Further, the rotor for the permanent magnet embedded-type motor may include a plurality of rivet holes formed through along the circumferential direction between the magnet insertion hole and a rotary shaft hole with the rotary shaft fixed of the rotor core and a plurality of weight-losing holes formed through along the circumferential direction between the magnet insertion hole and the rotary shaft hole with the rotary shaft fixed of the rotor core.

According to the above aspect of the present invention, it is possible to form a rivet hole with a rivet, which connects the rotor cores stacked, forming through, and a weight-losing hole for removing unnecessary weight of the rotor core between the rotary shaft hole formed at a center of the rotor core and a magnet insertion hole formed along a circumferential direction of the rotor core. It is possible for the rivet hole and the weight-losing hole to function as a flow path of refrigerant, thus enhancing a cooling efficiency of a motor and achieving a light weight and cost savings.

The plurality of weight-losing holes may be formed to intersect with a circle connecting centers of the plurality of rivet holes.

The plurality of rivet holes and the plurality of weight-losing holes may have each of inner side end portions formed at a radially outer side further than 15.9 mm apart from the center of the rotor core.

The plurality of rivet holes and the plurality of weight-losing holes may have each of outer side end portions formed at a radially inner side further than 20.1 mm apart from the center of the rotor core.

The plurality of rivet holes may have a circular shape, and an extension line of a symmetry axis of each of the magnet insertion holes is positioned to pass the center of each of the rivet holes.

The plurality of weight-losing holes may be symmetrical with respect to a straight line connecting a center of an interval between the pair of the adjacent magnet insertion holes and the center of the rotary shaft hole.

Each of the weight-losing holes may have an inner side end portion and an outer side end portion formed as a part of a circle with respect to the center of the rotary shaft hole and have both side end portions connecting the inner side end portion and the outer side end portion formed as a part of a circle with respect to the center of the rivet hole with each of the side end portions opposite.

The outer side end portion may be formed to be longer than a length of the inner side end portion, and the both side end portions may have the same length.

The both side end portions of the weight-losing hole may be formed to be spaced more than 8 mm apart from the center of the rivet hole with each of the side end portions opposite.

The number of the magnet insertion holes is characterized by being eight.

According to another embodiment of the present invention, there is provided is a permanent magnet embedded-type motor comprising housing, a stator fixed within the housing, and a rotor rotatably mounted within the stator, wherein the rotor is any one of the above-described rotors.

Herein, the stator may include twelve slots and the rotor may include eight poles.

Advantageous Effects

According to the aspects of the present invention having the above configurations, it is possible to form only the barrier hole at the inner side surface of the magnet insertion hole, thus reducing a cogging torque compared to a prior art.

Further, it is possible to form the barrier hole from the outermost side of the magnet, thus reducing a size of the barrier hole, minimizing influence on rigidity or efficiency and the like; and reducing a cogging torque by about a half compared to a prior art.

Further, it is possible to include the plurality of rivet holes and the plurality of weight-losing holes formed through along the circumferential direction between the magnet insertion hole and the rotary shaft hole of the rotor core, thus achieving a light weight and cost savings of the rotor.

Further, it is possible for the plurality of rivet holes and the plurality of weight-losing holes to function as a flow path of refrigerant, thus enhancing a cooling efficiency of the motor.

Effects of the present invention are not limited to the above effects, and it is to be understood that both the foregoing general description and the following detailed description of the present invention are exemplary and explanatory and are intended to provide further explanation of the invention as claimed.

DESCRIPTION OF DRAWINGS

FIG. 1 is a plan view of a conventional, general rotor for a permanent magnet embedded-type motor.

FIG. 2 is a schematic plan view of one embodiment of a permanent magnet embedded-type motor according to the present invention.

FIG. 3 is an enlarged plan view illustrating the vicinity of the end portion of the rotor in FIG. 2.

FIG. 4 is a graph measuring the cogging torque in the conventional rotor for the permanent magnet embedded-type motor.

FIG. 5 is a graph measuring the cogging torque in the rotor shown in FIG. 3.

FIG. 6 is a graph illustrating variation of the cogging torque and the torque ripple according to a length of the barrier hole in FIG. 2.

FIG. 7 is a view illustrating the stress distribution when operating the rotor shown in FIG. 2 at 15000 rpm according to variation of the temperature.

FIG. 8 is a plan view illustrating separately the rotor shown in FIG. 2.

FIG. 9 is an enlarged plan view illustrating the portion A of FIG. 8.

FIG. 10 is a view illustrating the magnetic flux density according to the position of the rotor shown in FIG. 9.

MODE FOR INVENTION

Hereinafter, the embodiment of the rotor for the permanent magnet embedded-type motor and the rotor using the same according to the present invention will be described in detail with reference to the attached drawings.

Further, the following terminologies are defined in consideration of the functions in the present invention and may be construed in different ways by intention of users and operators or precedents. Therefore, the definitions of terms used in the present description should be construed based on the contents throughout the specification.

Hereinafter, exemplary embodiments of the present will be described in detail with reference to the accompanying drawings.

FIG. 2 is a schematic plan view of one embodiment of a permanent magnet embedded-type motor according to the present invention. FIG. 3 is an enlarged plan view illustrating the vicinity of the end portion of the rotor in FIG. 2. FIG. 4 is a graph measuring the cogging torque in the conventional rotor for the permanent magnet embedded-type motor. FIG. 5 is a graph measuring the cogging torque in the rotor shown in FIG. 3. FIG. 6 is a graph illustrating variation of the cogging torque and the torque ripple according to a length of the barrier hole in FIG. 2. FIG. 7 is a view illustrating the stress distribution when operating the rotor shown in FIG. 2 at 15000 rpm according to variation of the temperature. FIG. 8 is a plan view illustrating separately the rotor shown in FIG. 2. FIG. 9 is an enlarged plan view illustrating the portion A of FIG. 8. and FIG. 10 is a view illustrating the magnetic flux density according to the position of the rotor shown in FIG. 9.

Referring to FIG. 2, one embodiment of a permanent magnet embedded-type motor according to the present invention includes a hosing, not shown, a stator 50 fixed within the housing, and a rotor 100 rotatably supported within the stator.

The stator 50 has a shape which stacks a plurality of sheet materials having a ring shape with an inner portion passed through and may be fixed within the housing using a press fitting method and the like. The stator includes a plurality of teeth 52 formed to protrude toward a radially inner side and a coil 54 wound around the teeth.

The rotor 100 is installed within the stator 50. The rotor 100 includes a plurality of permanent magnets 110 so as to receive and rotate an electromagnetic force generated by a current flow of a coil wound around the stator. Further, a rotary shaft 220 is fixed to a center of the rotor 100 to integrally rotate with the rotor 100.

Herein, the number of the teeth 52 formed at the stator is totally twelve and thus the number of slots formed between the teeth 52 is also twelve. Further, the rotor 100 totally has eight of magnet insertion holes, which will be described later. That is, the motor disclosed in the above embodiment is a so-called 8-pole, 12-slot motor, but the invention is not necessarily limited thereto.

Next, the rotor will be described in more detail with reference to FIG. 3. As shown in FIGS. 2 and 3, the rotor 100 includes a rotor core 102 formed by stacking a plurality of electric steel plates like the stator. The rotor core 102 not only supports the rotary shaft 220 and the permanent magnet 110, but also constitutes an overall shape of the rotor 100.

A rotary shaft hole 200 with the rotary shaft 220 inserted and combined is formed substantially at a center of the rotor core 102, and at least one of the permanent magnet 110 is inserted into at the outermost side of the rotor core 102. Herein, the permanent magnet 110 is inserted into and fixed to an inner portion of the permanent magnet insertion hole 103 formed to have a substantially V-shape so that the permanent magnet may be inserted. More specifically, the permanent magnet insertion hole 103 has a V-shape, which is gradually spaced from each other toward a radially outer side, that is, which is wide open toward an opposite side of the stator 50, and a pair of the permanent magnets 110 are inserted into the permanent magnet insertion hole 103 having the V-shape.

At this time, eight of the permanent magnet insertion holes 103 are preferably positioned at regular intervals along an outer circumferential direction of the rotor core 102.

The permanent magnet insertion hole 103 includes a pair of inner sides 104 to be gradually spaced from each other toward a radially outer side. The pair of inner sides 104 are positioned to face each other while placing the rotor core 102 therebetween and may be positioned in a V-shape having a substantially obtuse angle.

An outer side fixing protrusion 105 and an inner side fixing protrusion 106 are formed at a pair of outer sides facing the inner side 104. The outer side and inner side fixing protrusions 105, 106 define a space with the permanent magnet 110 inserted therebetween. That is, both end portions of the permanent magnet 110 are in contact with the outer side and inner side fixing protrusions 105, 106, thus preventing movement of the permanent magnet in a longitudinal direction of the permanent magnet insertion hole. To this end, the permanent magnet may be stably supported within the permanent magnet insertion hole.

Meanwhile, the radially outer side end of the permanent magnet 110 is formed with two spaces, and a side away from the inner side 104 is formed with a space portion 107 having a cross-section of substantially triangular. And, a barrier hole 108 connected with the space portion 107 and protruded from the inner side 104 is further formed.

The space portion 107 and the barrier hole 108 are a space integrally formed with the permanent magnet insertion hole 103 and are named with respect to the radially outer side end portion of the permanent magnet in a status inserted by the permanent magnet 110. The space portion 107 and the barrier hole 108 are configured as an empty space as described above and thus refrain from forming a magnetic path that delivers a magnetic flux generated from the permanent magnet. To this end, the magnetic flux, which is generated from the end portion of the permanent magnet, affecting the above-described stator is minimized.

More specifically, the space portion 107 mainly functions as blocking the magnetic flux generated from one side end portion of the permanent magnet, and the barrier hole 108 mainly functions as blocking the magnetic flux generated from a side surface adjacent to the one side end portion of the permanent magnet.

According to research results of the present inventors, it was found that as one of the important factors causing a cogging torque, the magnetic flux generated from the end portion of the permanent magnet affects stator and thus disturbs the rotation of the rotor. Accordingly, as described above, it is possible to form the space portion 107 and the barrier hole 108 blocking the magnetic path at the end portion of the permanent magnet 110 and the side surface, respectively, thus greatly reducing the cogging torque.

Meanwhile, the barrier hole 108 may be formed as a space portion having an arbitrary shape which protrudes toward each other from the inner side 104. In the embodiment shown, the barrier hole 108 is formed to have a circular arc shape extending toward each other along a circumferential direction from an outermost side end portion of the permanent magnet insertion hole 103.

Herein, a length (L) and a width (d1) of the barrier hole 108 and a distance (d2) from the outer side end portion of the rotor core affect a shape of the barrier hole 108 as well as a cogging torque, a torque ripple and rigidity of the rotor core by the barrier hole.

First, the width (d1) of the barrier hole 108 may be preferably smaller as much as possible. A smaller width (d1) may even further minimize reduction of rigidity, but due to the processing limitations, a minimum value of the width (d1) defines as 0.4 mm.

The length (L) of the barrier hole 108 is one of main factors that affect rigidity of the rotor, a cogging torque, and a torque ripple and the like. In the embodiment shown, it may be seen that the length of the barrier hole 108 is 1.5 mm, and a longer length of the barrier hole further reduces the cogging torque, while the rigidity reduces and the torque ripple increases.

FIG. 6 is a graph illustrating variation of sizes of the cogging torque and the torque ripple according to variation of the length (L). As shown in FIG. 6, the cogging torque tends to further decrease with respect to a longer length (L). However, the torque ripple, on the contrary, tends to further increase with respect to a longer length (L). Herein, it may be shown that the cogging torque is continuously reduced in a range of 1.1 mm to 1.5 mm, but the torque ripple is kept constant. Accordingly, according to the graph, it may be seen that an increment in the torque ripple is somewhat restrained and the cogging torque is greatly reduced in a length (L) of 1.5 mm.

Meanwhile, the length (L) may be also represented in other format. That is, the length (L) may be represented by an angle (θ) of two lines connecting the both end portions of the barrier hole and the position to be spaced the distance (D) (herein, 0.98 mm) apart from the center of the rotor toward a radially outer side. In the embodiment shown, the angle (θ) is preferably in a range of 12° to 14°. Herein, the position lies on a straight line connecting the center of the rotor and the center between the two permanent magnets.

And, the distance (d2) between the radially outer side surface of the barrier hole and an outer side surface of the rotor core may be 0.4 mm A smaller distance (d2) is also good, but because the position between the radially outer side surface of the barrier hole and the outer side surface of the rotor core functions as supporting a centrifugal force applied to the magnet during a high speed rotation of the rotor, it may be difficult to stably fix the permanent magnet if the distance (d2) is too small.

FIG. 4 is a graph illustrating a result of measuring the cogging torque in the motor having the rotor free of the barrier hole 108. FIG. 5 is a graph illustrating a result of measuring the cogging torque in the motor having the rotor shown in FIG. 2. Referring to FIGS. 4 and 5, a vertical axis represents a magnitude of the cogging torque and a horizontal axis represents a value corresponding to a testing period of each of the cogging torque. That is, the horizontal axis represents the number of testing steps, and the graphs shown in FIGS. 4 and 5 divide one period of a power, which is output during a testing operation, into 193 steps and show the cogging torque which is output in each step.

As shown, it can be seen that in the conventional motor, the cogging torque of approximately 0.80 Nm is generated, while in the above embodiment, the cogging torque of 0.30 Nm being less than a half is generated. That is, it is possible to form a hole of about 1.5 mm at the inner side of the conventional permanent magnet insertion hole, thus reducing the cogging torque by less than half.

In terms of rigidity, as shown in FIG. 7, as a result of operating the rotor of FIG. 2 at a rotary speed of 15000 rpm at 25° C., 40° C., 60° C., 100° C., 140° C., and 180° C., respectively, it may be seen that the stress at the position where the barrier hole is positioned regardless of the temperature is the largest. However, it may be also seen that it has not much difference from the stress at the radially outermost portion free of the barrier hole.

That is, it may be seen that even if the barrier hole is further formed as described above, the influence on rigidity of the rotor core are insignificant.

Further, as shown in FIG. 8, a plurality of rivet holes 400 and a plurality of weight-losing holes 500 may be formed through along a circumferential direction between the permanent magnet insertion hole 103 and the rotary shaft hole 200 of the rotor core 102.

More specifically, the plurality of rivet holes 400 are formed through in the circumferential direction between the permanent magnet insertion hole 103 and the rotary shaft hole 200, and eight of rivet holes are preferably positioned at regular intervals like the number of the permanent magnet insertion hole 103.

The rotor is formed by stacking a plurality of the rotor core members being a plurality of thin discs and a plurality of rivets 420 passing through and connected to the plurality of the rivet holes 400 function as connectors so that the stacked rotor core members may form one rotor, thus assembling easily.

The shape of the plurality of rivet holes 400 is preferably a circular shape and may be a square or a ladder other than a circular shape. Each of the rivet holes 400 is positioned so that an extension line (a) of a symmetry axis of each of the permanent magnet insertion holes 103 passes the center of each of the rivet holes 400.

Because the rotor core portion between the V-shaped permanent magnets functions as passage of a magnetic flux, the magnetic flux receives resistance upon formation of the rivet hole. Accordingly, it is necessary to form the rivet hole at the position that does not form the magnetic path in the space portion of the rotor core between the rotary shaft hole 200 and the permanent magnet insertion hole 103.

Accordingly, the plurality of rivet holes 400 have an inner side end portion formed at a radially outer side further than 15.9 mm apart from the center of the rotor core 102, that is, the center of the rotary shaft hole 200 and have an outer side end portion formed at a radially inner side further than 20.1 mm apart from the center of the rotary shaft hole 200.

Referring to FIG. 10 illustrating the magnetic flux density according to the position of the rotor, the reason is why the above corresponds to a low range of the magnetic flux density. Referring to FIG. 10, it may be seen that the lowest region of the magnetic flux density appears in the vicinity of the rotary shaft hole 200, a low range of the magnetic flux density appears at the rotor core portion between the rotary shaft hole 200 and the permanent magnet insertion hole 103, and a high range of the magnetic flux density appears in the vicinity of the permanent magnet insertion hole 103.

However, in a case of forming a plurality of rivet holes in the vicinity of the rotary shaft hole 200 having the lowest magnetic flux density, a supporting force supporting the rotary shaft weakens and the rotation of the rotor becomes unstable. Accordingly, it is preferable to form the rivet hole at the position capable of having a low density of the magnetic flux, thus not disturbing passage of the magnetic flux and sufficiently supporting the rotary shaft, such as limiting a range of the inner side end portion and the outer side end portion of the plurality of rivet holes 400. Accordingly, losses of performance and efficiency of the rotor do not occur due to the formation of the rivet hole.

Referring to FIG. 9, the plurality of rivet holes 400 of the rotor for the permanent magnet embedded-type motor according to one embodiment of the present invention have a center of each of the plurality of rivet holes positioned at the position 18 mm radially apart from the center of the rotary shaft hole 200 and are formed in a circular shape having a diameter of 4.15 mm.

The plurality of weight-losing holes 500 are formed through along the circumferential direction between the permanent magnet insertion hole 103 and the rotary shaft hole 200 and are formed to intersect with a circle connecting the centers of the plurality of rivet holes 400. Each of the plurality of weight-losing holes 500 is formed between the rivet holes 400 and are formed with the same as the number of the plurality of rivet holes 400. Accordingly, eight of the weight-losing holes are preferably formed at regular intervals.

The plurality of weight-losing holes 500 are preferably positioned to be symmetrical with respect to a straight line (b) connecting a center of an interval between a pair of adjacent permanent magnet insertion holes 103 and the center of the rotary shaft hole 200.

The reason is why the rotor core portion between the V-shaped permanent magnets functions as passage of the magnetic flux and thus the magnetic flux receives resistance upon the formation of the weight-losing hole. Accordingly, it is necessary to form the weight-losing hole at the position not forming the magnetic path in a space portion between the plurality of rivet holes.

Accordingly, the plurality of weight-losing holes 500 have the inner side end portion formed at a radially outer side further than 15.9 mm apart from the center of the rotor core 102, that is, the center of the rotary shaft hole 200, and have the outer side end portion formed on a radially inner side further than 20.1 mm apart from the center of the rotary shaft hole 200.

Likewise, referring to FIG. 10 illustrating the magnetic flux density according to the position of the rotor, the reason is why the above corresponds to a low range of the magnetic flux density. Referring to FIG. 10, the lowest region of the magnetic flux density appears in the vicinity of the rotary shaft hole 200. A low range of the magnetic flux density appears at the rotor core between the rotary shaft hole 200 and the permanent magnet insertion hole 103, and a high range of the magnetic flux density appears in the vicinity of the permanent magnet insertion hole 103.

However, when forming the plurality of weight-losing holes 500 in the vicinity of the rotary shaft hole 200 having the lowest magnetic flux density, a supporting force weakens and the rotation of the rotor becomes unstable. Accordingly, it is preferable to form the weight-losing hole at the position capable of having a low magnetic flux density. Thus, not disturbing passage of the magnetic flux and sufficiently supporting the rotary shaft, such as limiting a range of the inner side end portion and the outer side end portion of the plurality of weight-losing holes 500. Accordingly, losses of performance and efficiency of the rotor do not occur due to the formation of the weight-losing hole.

Further, it is possible to achieve a light weight of the rotor due to the formation of the plurality of weight-losing holes 500, and it is possible for each of the plurality of weight-losing holes to function as a flow path of refrigerant, thus also achieving a good cooling efficiency of the motor.

Referring to FIG. 9, the plurality of weight-losing holes 500 of the rotor for the permanent magnet embedded-type motor according to one embodiment of the present invention have a center of each of the weight-losing holes 500 positioned at the position 18 mm radially apart from the center of the rotary shaft hole 200, and a detailed shape will be described hereinafter.

Each of the weight-losing holes 500 preferably has a shape of a trapezoid having all sides configured as a part of a circle. According to the above configuration, it is possible to maximally use the range not disturbing the magnetic path, thus achieving a light weight while maintaining rigidity of the rotor. However, the present invention is not limited thereto, and may be changed in any shape such as a round, a square, a triangular and the like depending on the shape and the size of the rotor.

Each of the weight-losing holes 500 has an inner side end portion 502 and an outer side end portion 501 formed as a part of a circle with respect to the center of the rotary shaft hole 200 and has both side end portions 503, 504 connecting the inner side end portion 502 and has the outer side end portion 501 formed as a part of a circle with respect to the center of the rivet hole with each of the side end portions opposite.

To this end, the outer side end portion 501 and the inner side end portion 502 of each of the weight-losing holes and the rotary shaft hole 200 are all positioned on a concentric circle. An interval between the inner side end portion 502 of each of weight-losing holes and the rotary shaft hole 200 may be kept constant at anywhere, thus constantly maintaining rigidity of the rotor.

Further, because an interval between both side end portions 503, 504 of each of the weight-losing holes and the rivet hole 400 with each of the side end portions opposite is kept constant at anywhere, rigidity of the rotor may be kept constant.

The outer side end portion 501 is formed to be longer than the inner side end portion 502, and the both side end portions 503, 504 may be formed with the same length. Further, the both side end portions 503, 504 of the weight-losing hole are preferably positioned to be radially spaced more than 8 mm apart from the center of the rivet hole 400 with each of the side end portions opposite. The reason is why if the both side end portions 503, 504 of the weight-losing hole are positioned within 8 mm radially apart from the center of the rivet hole 400 with each of the side end portions opposite, the thickness of the rotor core between each of the rivet holes 400 and the weight-losing hole 500 becomes thinned and the magnetic flux does not pass, thus weakening overall supporting force and durability.

Referring to FIG. 9, each of the plurality of weight-losing holes 500 of the rotor for the permanent magnet motor according to one embodiment of the present invention has the inner side end portion 502 formed as a part of a circle having a diameter of 31.85 mm with respect to the center of the rotary shaft hole 200 and has the outer side end portion 501 formed as a part of a circle having a diameter of 40.15 mm with respect to the center of the rotary shaft hole 200. Further, the both side end portions 503, 504 are formed as a part of a circle having a diameter of 8 mm with respect to the center of the rivet hole with each of the side end portions opposite, and thus formed to be spaced by 8 mm.

As described above, according to the above embodiments of the present invention, it is possible to form a hole of about 1.5 mm at an inner side of a conventional permanent magnet insertion hole, thus reducing a cogging torque by less than a half and also improving noise of the motor.

Further, it is possible to form a plurality of holes at predetermined regions on a rotor core, thus achieving a light weight and cost savings and also to function as a flow path of refrigerant, thus enhancing a cooling efficiency.

Although the embodiments of the present invention have been described in detail as described above, they are only examples. It will be appreciated by those skilled in the art that various modifications and equivalent other embodiments are possible from the present invention. Therefore, the scope of the present invention is to be defined by the following claims.

INDUSTRIAL APPLICABILITY

The present invention relates to a rotor for a permanent magnet embedded-type motor and a motor using the same, and more particularly, to a rotor having a permanent magnet embedded therein and a motor having the same.

The invention claimed is:

1. A rotor for a permanent magnet embedded-type motor, comprising:
 a rotor core having a rotary shaft fixed to a center and having a plurality of magnet insertion holes formed to be spaced along a circumferential direction;
 a plurality of pairs of permanent magnets, respectively, inserted into each of the plurality of magnet insertion holes in a V-shape to be gradually spaced apart from each other toward a radially outer side,
 a plurality of rivet holes formed through along the circumferential direction between the magnet insertion hole and a rotary shaft hole with the rotary shaft fixed of the rotor core; and
 a plurality of weight-losing holes formed through along the circumferential direction between the magnet insertion hole and the rotary shaft hole with the rotary shaft fixed of the rotor core,
 wherein each of the plurality of magnet insertion holes comprises a pair of inner sides facing each other,
 wherein a barrier hole is further formed to expand an inner space of each of the magnet insertion holes so as to protrude toward each other from the pair of inner sides, respectively,
 wherein the plurality of weight-losing holes are formed to intersect with a circle connecting centers of the plurality of rivet holes, and
 wherein an extension line of a symmetry axis of each of the magnet insertion holes is positioned to pass the center of each of the rivet holes.

2. The rotor for the permanent magnet embedded-type motor of claim 1,
 wherein the barrier hole is extended in a circular arc shape.

3. The rotor for the permanent magnet embedded-type motor of claim 2, wherein each of the magnet insertion holes is formed to have a V-shape, and wherein the barrier hole is extended along a circumferential direction toward a center of the magnet insertion hole.

4. The rotor for the permanent magnet embedded-type motor of claim 3, wherein an angle of two lines connecting both end portions of the barrier hole and the center of the rotor core, respectively is 12° to 14°.

5. The rotor for the permanent magnet embedded-type motor of claim 3, wherein the barrier hole has a length of 1.1 mm to 1.5 mm.

6. The rotor for the permanent magnet embedded-type motor of claim 1, wherein the barrier hole has a thickness of more than 0.4 mm.

7. The rotor for the permanent magnet embedded-type motor of claim 1, wherein the plurality of rivet holes and the plurality of weight-losing holes have each of inner side end portions formed at a radially outer side further than 15.9 mm apart from the center of the rotor core.

8. The rotor for the permanent magnet embedded-type motor of claim 7, wherein the plurality of rivet holes and the plurality of weight-losing holes have each of outer side end portions formed at a radially inner side further than 20.1 mm apart from the center of the rotor core.

9. The rotor for the permanent magnet embedded-type motor of claim 1, wherein the plurality of rivet holes have a circular shape.

10. The rotor for the permanent magnet embedded-type motor of claim 1, wherein the plurality of weight-losing holes are symmetrical with respect to a straight line connecting a center of an interval between the pair of the adjacent magnet insertion holes and the center of the rotary shaft hole.

11. The rotor for the permanent magnet embedded-type motor of claim 10, wherein each of the weight-losing holes has an inner side end portion and an outer side end portion formed as a part of a circle with respect to the center of the rotary shaft hole and has both side end portions connecting the inner side end portion and the outer side end portion formed as a part of a circle with respect to the center of the rivet hole with each of the side end portions opposite.

12. The rotor for the permanent magnet embedded-type motor of claim 11, wherein the outer side end portion is formed to be longer than a length of the inner side end portion, and the both side end portions have the same length.

13. The rotor for the permanent magnet embedded-type motor of claim 12, wherein the both side end portions of the weight-losing hole are formed to be spaced more than 8 mm apart from the center of the rivet hole with each of the side end portions opposite.

14. The rotor for the permanent magnet embedded-type motor of claim 1, wherein the number of the magnet insertion holes is eight.

15. A permanent magnet embedded-type motor, comprising:
 housing;
 a stator fixed within the housing; and
 a rotor rotatably mounted within the stator,
 wherein the rotor, comprises:
 a rotor core having a rotary shaft fixed to a center and having a plurality of magnet insertion holes formed to be spaced along a circumferential direction,
 a plurality of pairs of permanent magnets, respectively, inserted into each of the plurality of magnet insertion holes in a V-shape to be gradually spaced apart from each other toward a radially outer side,
 a plurality of rivet holes formed through along the circumferential direction between the magnet insertion hole and a rotary shaft hole with the rotary shaft fixed of the rotor core; and
 a plurality of weight-losing holes formed through along the circumferential direction between the magnet insertion hole and the rotary shaft hole with the rotary shaft fixed of the rotor core,
 wherein each of the plurality of magnet insertion holes comprises a pair of inner sides facing each other,
 wherein a barrier hole is further formed to expand an inner space of each of the magnet insertion holes so as to protrude toward each other from the pair of inner sides, respectively,
 wherein the plurality of weight-losing holes are formed to intersect with a circle connecting centers of the plurality of rivet holes, and
 wherein an extension line of a symmetry axis of each of the magnet insertion holes is positioned to pass the center of each of the rivet holes.

16. The permanent magnet embedded-type motor of claim 15, wherein the stator comprises twelve slots, and the rotor comprises eight poles.

17. A permanent magnet embedded-type motor, comprising:
 housing;
 a stator fixed within the housing; and
 a rotor rotatably mounted within the stator, wherein the rotor, comprising:
a rotor core having a rotary shaft fixed to a center and having a plurality of magnet insertion holes formed to be spaced along a circumferential direction;
a plurality of pairs of permanent magnets, respectively, inserted into each of the plurality of magnet insertion holes in a V-shape to be gradually spaced apart from each other toward a radially outer side,
a plurality of rivet holes formed through along the circumferential direction between the magnet insertion hole and a rotary shaft hole with the rotary shaft fixed of the rotor core; and
a plurality of weight-losing holes formed through along the circumferential direction between the magnet insertion hole and the rotary shaft hole with the rotary shaft fixed of the rotor core,
wherein each of the plurality of magnet insertion holes comprises a pair of inner sides facing each other,
wherein a barrier hole is further formed to expand an inner space of each of the magnet insertion holes so as to protrude toward each other from the pair of inner sides, respectively,
wherein the plurality of weight-losing holes are formed to intersect with a circle connecting centers of the plurality of rivet holes, and
wherein the plurality of weight-losing holes are symmetrical with respect to a straight line connecting a center of an interval between the pair of the adjacent magnet insertion holes and the center of the rotary shaft hole.

18. A rotor for a permanent magnet embedded-type motor, comprising:
a rotor core having a rotary shaft fixed to a center and having a plurality of magnet insertion holes formed to be spaced along a circumferential direction;
a plurality of pairs of permanent magnets, respectively, inserted into each of the plurality of magnet insertion holes in a V-shape to be gradually spaced apart from each other toward a radially outer side,
a plurality of rivet holes formed through along the circumferential direction between the magnet insertion hole and a rotary shaft hole with the rotary shaft fixed of the rotor core; and
a plurality of weight-losing holes formed through along the circumferential direction between the magnet insertion hole and the rotary shaft hole with the rotary shaft fixed of the rotor core,
wherein each of the plurality of magnet insertion holes comprises a pair of inner sides facing each other,
wherein a barrier hole is further formed to expand an inner space of each of the magnet insertion holes so as to protrude toward each other from the pair of inner sides, respectively,
wherein the plurality of weight-losing holes are formed to intersect with a circle connecting centers of the plurality of rivet holes, and
wherein the plurality of weight-losing holes are symmetrical with respect to a straight line connecting a center of an interval between the pair of the adjacent magnet insertion holes and the center of the rotary shaft hole.

* * * * *